United States Patent [19]
Law

[11] Patent Number: 4,981,324
[45] Date of Patent: Jan. 1, 1991

[54] VENTILATED BACK-SEAT SUPPORT PAD PARTICULARLY FOR VEHICLES

[76] Inventor: Ignace K. Law, 1311 S. Stevens St. #H, San Gabriel, Calif. 91776

[21] Appl. No.: 420,952

[22] Filed: Oct. 13, 1989

[51] Int. Cl.$^5$ .............................................. A47C 7/74
[52] U.S. Cl. ...................................... 297/180; 5/423; 98/2.03; 297/453
[58] Field of Search ................. 297/180, 453; 98/2.03; 5/421, 423, 453, 469

[56] References Cited

U.S. PATENT DOCUMENTS

| | | | |
|---|---|---|---|
| 2,758,532 | 8/1956 | Awe | 297/180 X |
| 2,931,286 | 4/1960 | Fry, Sr. et al. | 297/180 X |
| 3,137,523 | 6/1964 | Karner | 297/180 |
| 3,529,316 | 9/1970 | Olmo | 297/453 |
| 3,757,366 | 9/1973 | Sacher | 297/453 |
| 4,002,108 | 1/1977 | Drori | 297/453 |
| 4,141,585 | 2/1979 | Blackman | 297/453 |
| 4,259,896 | 4/1981 | Hayashi et al. | 297/453 |
| 4,589,656 | 5/1986 | Baldwin | 297/180 X |
| 4,629,253 | 12/1986 | Williams | 297/453 |
| 4,729,598 | 3/1988 | Hess | 297/453 |

Primary Examiner—Peter R. Brown
Attorney, Agent, or Firm—James Bartholomew

[57] ABSTRACT

A ventilated back support pad configured to rest atop an automobile seat is provided with a plurality of apertures on one or more of its faces. Forced air is channeled from a selected automotive air vent through the apertures via a flexible hose having one end connected with air passageways within the support pad. The opposite end of the flexible hose includes a funnel shaped attachment head adapted for releasibly engaging the selected air vent. This attachment head includes two locking pins which can be manually secured to a louver of the vent. In other preferred embodiments of the invention, the back support pad can be provided with a ventilated seat support rest integrally formed therewith and/or internally mounted electric fan. Further, as an alternative to the use of many apertures, a single enlarged aperture covered by a screen, or the like, can be utilized to allow forced air to escape from the support pad. In use, conforting cool or warm air is conducted from an automotive air vent through the back support pad and onto areas of a passenger's body, particularly the back, which are not normally contacted by air that is conventionally circulated within a vehicle.

12 Claims, 2 Drawing Sheets

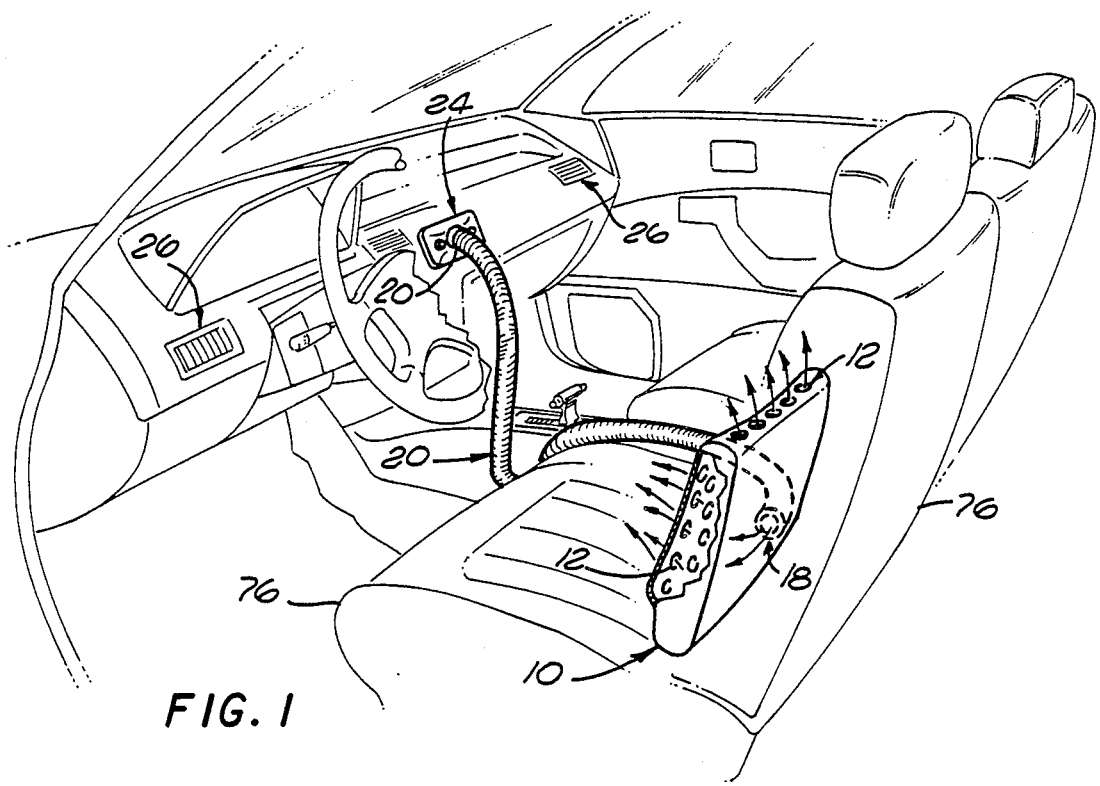
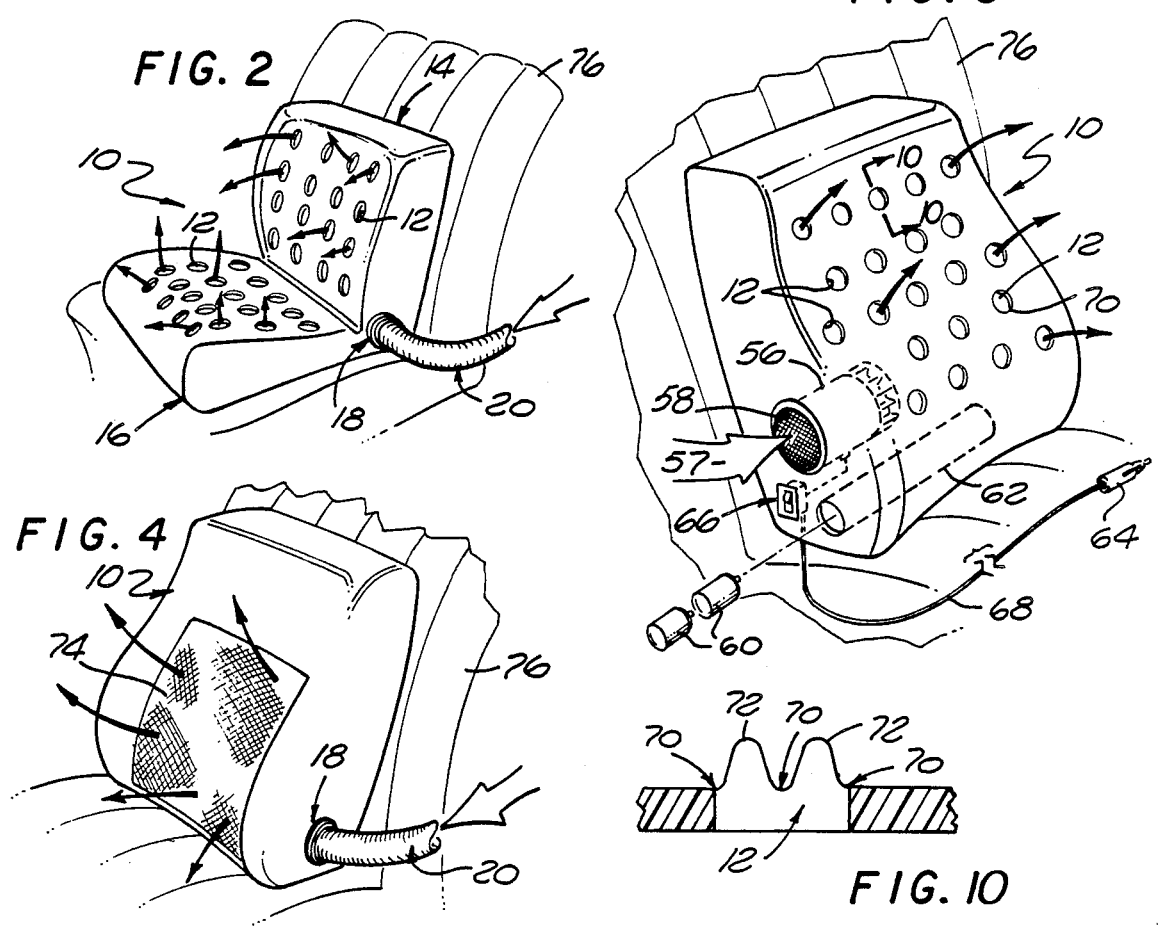

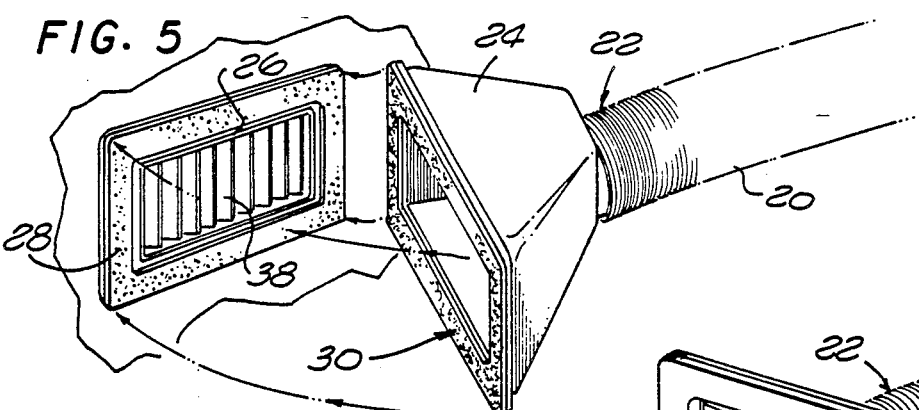
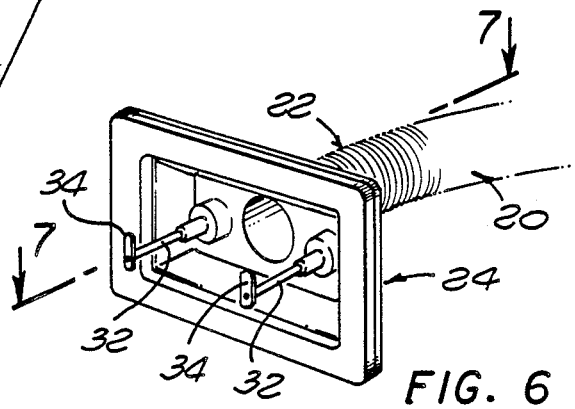
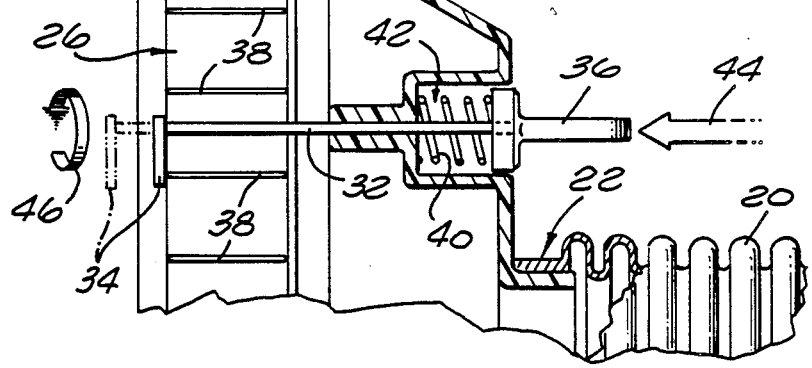
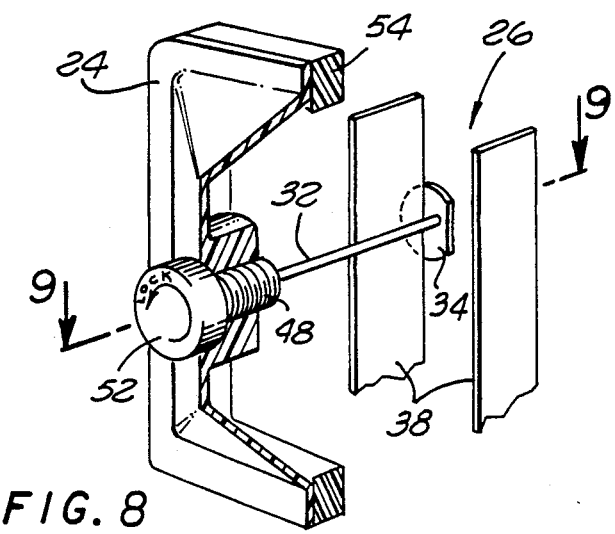
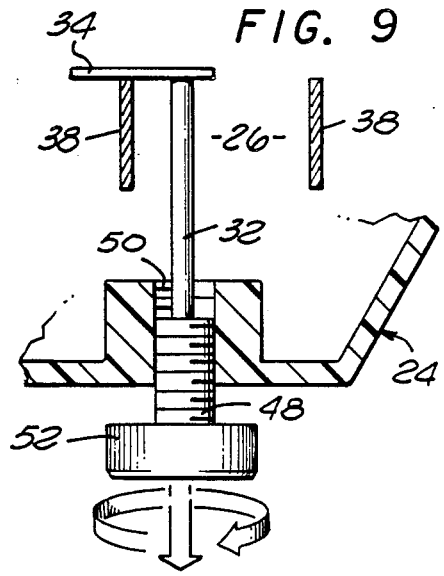

VENTILATED BACK-SEAT SUPPORT PAD PARTICULARLY FOR VEHICLES

BACKGROUND OF THE INVENTION

This invention relates generally to an improved ventilated chair back rest or seat rest. More particularly, this invention relates to an improved ventilated support pad that directs air flow from an automotive air conditioning system or air vent to areas of a passenger's body which do not normally receive a comforting air flow from circulatory patterns conventionally achieved within an automobile. The present invention resides also in advantageous arrangements for attaching the ventilated support pad to a selected vent within a vehicle.

It has been appreciated in the prior art that a seat or back rest that provides a cooling air flow would be advantageous and comforting for an occupant utilizing same. Structures of this type in the prior art are generally illustrated in U.S. Pat. Nos. 3,757,366 and 4,141,585.

Previously, a need for ventilated seat or back rests in vehicles arose because an occupier of a seat in an automobile or truck is often subjected to considerable discomfort because of a lack of air circulation between the occupant and the vehicle seat. In hot weather, a passenger in a vehicle seat is likely to sweat around the surface of the seat even if the windows are open or the air conditioning is employed. This is especially true when the seats of a parked vehicle have become extremely hot due to prolonged exposure to the sun. Thus, in use, the seats can quickly become sticky and uncomfortable.

Originally, this problem was addressed by a number of back rests and seats which were devised for spacing an occupant's back and/or seat from the vehicle seat. Because such devices were not entirely satisfactory, previous attempts were made to provide a ventilated automotive seat which directs forced air onto body portions supported by said seat. Exemplary of such previous ventilated automotive seats are U.S. Pat. Nos. 4,002,108 and 4,259,896. Arrangements for providing a supply of forced air to previous ventilated automotive seats generally utilized an auxiliary fan or incorporated air intake from the automobile fan or an air funnel fixed to the exterior of the vehicle.

The prior practice of drawing the air intake from means externally-mounted on the vehicle is less than ideal, in part because undesirable outside elements, such as dust and insects, may enter the vehicle during an unfiltered air intake, and further because external funnel means, or the like, generally can conduct air intake only while the vehicle is in motion. Moreover, prior art contemplating air intake from the automobile fan to a ventilated vehicle seat generally fell short of presenting an optimized arrangement whereby attachment of the ventilated seat into fluid communication with an automobile air conditioning system is easily and efficiently effected in a non-permanent manner utilizing means adapted for sealed engagement with practically all automotive air conditioning vents.

There exists, therefore, a need for an improved ventilated back-seat support apparatus which provides a selected cool or warm air flow to areas of a user's body which are normally not contacted by conventional air circulation within a vehicle. Such an improved apparatus should be quickly and removably attachable to nearly all automotive vent designs in a manner creating a seal for maximum air pressure throughout such a ventilated support system. Moreover, an improved ventilated back-seat support pad is needed which includes design features expressly directed towards alleviating an undesirable scenario wherein ventilated areas of the support pad are blocked by a person's body rested thereupon, and air is prevented from flowing through said support pad. The present invention fulfills these needs in a relatively inexpensive fashion and provides further related advantages.

SUMMARY OF THE INVENTION

The present invention resides in an improved ventilated back-seat support pad featuring means for placing the ventilated support pad in fluid communication with a selected automotive air vent, thereby channeling air flow from the automobile's ventilation system through apertures in the support pad and onto those areas of a user's body, particularly one's back, that normally are not contacted when air is conventionally circulated within a vehicle. The ventilated support pad generally comprises an apertured body contoured to comfortably accommodate one's back and/or seat, a flexible hose providing an air flow path between an automotive air vent and air passageway means within the apertured body, and an attachment head adapted to releasibly secure the hose to the vent.

The present invention advantageously provides a comforting air flow upon normally inaccessible portions of a user's body, thereby preventing one's body, especially the back, from becoming sweaty and sticking to an underlying seat. The utilization of the automobile's air conditioning system in cooperation with the present invention enables one to select the relative temperature of the air being circulated through the ventilated support pad so that the user can be refreshed by cool air in the summer and then warmed by hot air during winter. As a result, use of the present invention in vehicles allows passengers to travel more comfortably, thereby reducing fatigue.

The present invention does not intake air directly from the outdoors so that dust and insects are excluded from the comforting air flow exiting the apertures of the ventilated support pad. Moreover, the apertures are advantageously defined by rims having an irregular surface which spaces the user's body slightly outwardly from underlying apertures, thereby preventing complete blockage of the apertures and ensuring that a forced air flow continually escapes from the apertures.

Alternatively, the ventilated back-seat support pad can be provided with its own internally mounted source of forced air, preferably electric fan means, so that the invention can advantageously be used in wheelchairs, strollers, office chairs, etc. However, because the invention is especially useful for automotive vehicle seats, it is therefore described below, for purposes of example, with respect to that application.

In one preferred form of the invention, the ventilated support pad comprises a lightweight molded plastic body sized to fit atop an automobile seat and shaped to support a user's back and/or seat. A plurality of apertures are provided in one or more faces of the support pad. These apertures receive a positive air flow via one or more air passageways defined within the support pad. The air passageways are supplied with forced air by a flexible hose having one end connected to the ventilated support pad and the opposite, or free end, adapted for releasibly engaging an automotive air vent.

The free end of the flexible hose includes a funnel shaped attachment head configured to fit around most conventional automobile air vents, air conditioning outlets, or the like. The attachment head can be affixed to an air vent in several preferred ways, each of which is quick, easy, and non-permanent. One method of conveniently joining the attachment head to a selected air vent is to removably affix a border of hook and loop tape, preferably Velcro, around the perimeter of the selected vent and then mate this border with complimentary portions of Velcro, or the like, provided on the attachment head.

Another effective means for removably joining the attachment head to a desired air vent utilizes one or more locking pins rotatably retained within the attachment head. The locking pins each include a retaining disc adapted for releasably engaging the adjustable louver which is conventionally included within most car air vents. In use, each locking pin is manually rotated within the attachment head until the retaining disc at its end is oriented for interlocking with the louver. Next, the locking pin is positioned so as to bring its retaining disc into engagement with the louver. The return action of spring means can be used to bias the locking pin towards a desired position, or else the locking pin can include a threaded portion that is received within a threaded port in the attachment head, so that the locking pin can be screwed to an optimum position for engaging an air vent louver. In addition to one or more locking pins, the attachment head also includes means for effecting an airtight seal around whichever air vent said attachment head is coupled to.

In another preferred form of the invention, the ventilated support pad can utilize forced air provided by an electric fan mounted therein. The electric fan can be powered by one or more batteries provided within a battery compartment in the support pad. Alternatively, the electric fan can be energized by the automobile's battery, by utilizing an adapter which plugs into the cigarette lighter port of a vehicle.

A modification which is appropriate for each preferred form of the invention involves the use of a single enlarged aperture in the ventilated support pad, rather than a plurality of apertures therein. The enlarged aperture is covered by a screen or mesh which enables free passage of air through the enlarged aperture and into contact with a user.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a ventilated back support pad (shown partly in cut-away) embodying the invention, showing an air supply hose (partially presented in phantom) attached to an air vent within an automobile;

FIG. 2 is a perspective view of another embodiment of the invention, showing a ventilated back support pad having a ventilated seat portion integrally formed therewith, also illustrating, along with FIGS. 1, 3 and 4, a preferred orientation of the invention atop an automobile seat;

FIG. 3 is a slightly enlarged, fragmented, perspective view of yet another embodiment of the invention, illustrating a ventilated back support pad having an internally mounted electric fan (shown in phantom);

FIG. 4 is a fragmented perspective view of a ventilated back support having air exhaust (as indicated by arrows in FIGS. 1–4) through a screen rather than through a plurality of apertures as in FIGS. 1–3;

FIG. 5 is a fragmented perspective view of the free end of the air supply hose of FIGS. 1, 2 and 4, illustrating the funnel shape of the free end which is configured to fit over a conventional automobile vent (as indicated by arrows), and also illustrating a Velcro border around the funnel end for releasibly engaging a Velcro border around said vent;

FIG. 6 is a perspective view of the free funnel end of the air supply hose, illustrating an alternative arrangement wherein rotatable locking pins are provided for releasibly attaching to an automobile vent;

FIG. 7 is an enlarged, fragmentary cross-sectional view taken generally on line 7—7 of FIG. 6, illustrating the manner in which a spring biased rotatable locking pin of FIG. 6 releasibly engages a louver of the automobile vent;

FIG. 8 is an enlarged, fragmentary view, partially in cross-section, illustrating an alternative locking pin arrangement wherein a threaded locking pin is screwed into releasible engagement with said louver;

FIG. 9 is an enlarged, fragmentary cross sectional view taken generally on line 9—9 of FIG. 8, further illustrating the threaded locking pin in releasible engagement with the louver; and FIG. 10 is an enlarged fragmentary cross sectional view taken generally on line 10—10 of FIG. 3, illustrating an irregular profile of a rim of one of said apertures.

DETAILED DESCRIPTION OF THE PREFERRED EMBODIMENT

As shown in the drawings for purposes of illustration, the present invention resides in an improved ventilated back-seat support pad 10 (FIG. 1) which is adapted to utilize hot or cold air from an automotive ventilation system, thereby making the present invention particularly useful in vehicles as a means for circulating a comforting air flow onto areas of the body, particularly the back, which are not normally contacted by air that is conventionally circulated by automotive air conditioning systems.

The ventilated support pad of the present invention advantageously includes means for easily attaching the pad in fluid communication with a selected automotive air vent thereby incorporating forced air provided to the vehicle's interior by its ventilation system. This is an improvement over those prior ventilated back-seat rests which utilized means externally mounted on the vehicle to funnel air through an attached ventilated support. Such a prior practice has a number of drawbacks. First, because the movement of the vehicle is responsible for air intake into the externally mounted funnel means, no forced air flow is available when the vehicle is stopped. Thus, when an automobile is stuck in traffic and an auxiliary comforting air flow would be most appreciated, no air flow is provided by externally mounted air intake funnels, or the like. Moreover, the use of air directly from outside the vehicle may introduce dust and/or insects into a ventilated support apparatus. Finally, use of the automotive air conditioning system to supply forced air for the present invention enables one to select the desired relative temperature of the air which will be blown on a user by the ventilated backseat support pad, an advantage not achievable with the prior practice of using ambient air. Thus, with the present invention, cool air can be blown on one's body during hot weather and warm air can be employed during cold weather. As a result, passengers can travel more comfortably with less fatigue.

The present invention eliminates the undesirable previous scenario wherein one's back and seat become sweaty and sticky because conventional automotive air conditioning arrangements make no provision for blowing air onto these areas of the body. Although some prior ventilated seats and support rests do contemplate use of a forced air supply located internally within the vehicle, rather than directly utilizing ambient air, the prior art has generally neglected to provide ideal means for quickly and easily attaching the ventilated back and/or seat support to an automotive air vent in an air-tight, temporary manner which does not require the use of tools. The present invention accomplishes this in a relatively simple and inexpensive fashion.

In accordance with the present invention, a ventilated support pad 10 comprised of a lightweight, nonporous molded plastic material is provided with a plurality of apertures 12 through which comforting streams of forced air are blown onto one resting against the support pad. The support pad can be configured for back support only, as illustrated in FIGS. 1, 3 and 4, with appropriate contouring for lumbar support, or can be designed for back and seat support of a user, as illustrated in FIG. 2. A back support section 14 can be integrally formed with a seat support section 16, joined thereto by hinges, or connected therewith along one edge in any other conventional manner.

In each arrangement, the support sections 14 and 16 should be in fluid communication with each other. This is provided by hollow portions within the support pad 10 which serve as air passageways that direct a forced air flow from an end 18 of a flexible hose 20 through the apertures 12. Such a hollow portion serving as air passageway means is visible in the cut-away section of the support pad 10 in FIG. 1. The air passageways can be arranged as radial channels, spirally-extending channels, or any of a number of other configurations so long as each aperture 12 is in fluid communication with the flexible hose 20.

The flexible hose 20 is preferably at least one inch in diameter to allow an adequate volume of forced air to pass therethrough. Opposite the hose end 18, which is affixed to an air inlet port (not visible) of the support pad 10 in any conventional air-tight manner, the hose 20 has a free end 22 provided with a funnel shaped attachment 24.

The attachment head 24 is sized to fit around most conventional automotive air vents in the manner shown in FIG. 1. The attachment head can be removably secured about an automotive air vent 26 using one of three different preferred arrangements, each of which is quickly and easily effected without requiring the use of tools.

FIG. 5 illustrates one preferred way of releasibly joining the attachment head 24 to a selected automotive air vent 26. In this arrangement a border 28 of Velcro, or similar hook and loop tape, is affixed around the selected air vent 26, preferably using a re-usable, non-permanent adhesive so that the border 28 can be removed when not in use. A complimentary Velcro border 30 around the perimeter of the attachment head 24 is then easily mated with the border 28, thereby joining the attachment head 24 to the air vent 26.

In another preferred way of releasibly joining the attachment head 24 to a selected air vent 26, the attachment head 24 includes at least one, and preferably two, locking pins 32 which are rotatably retained within said attachment head. Each locking pin 32 has a retaining disc 34 disposed at its distal end at an orientation relatively perpendicular thereto. The locking pins 32 extend into the selected air vent 26 when the attachment head 24 is flush against the air vent's perimeter. The locking pins 32 are rotated manually using handles 36 so as to orient their retaining discs 34 into abutment with a portion of an adjustable louver 38 conventionally included within most automotive air vents. Engagement of the retaining disc 34 with the louver 38 is illustrated in FIGS. 7-9.

In order to achieve the engaged, abutting relationship between the retaining disc 34 and the louver 38, as illustrated, the locking pins 32 must be extended into the air vent 26 until the retaining disc 34 is beyond the louver 38, as illustrated in phantom in FIG. 7. Because of slightly different air vent and louver dimensions among automobiles, means must be provided for allowing the locking pins 32 to move inwardly or outwardly relative to the attachment head 24.

In one preferred embodiment (FIG. 7), a spring 40 retained within a cavity 42 in the attachment head 24 is employed to bias the associated locking pin 32 outwardly from an adjacent air vent 26. To effect engagement of the locking pin 32 with the louver 38, the handle 36 is pushed into the cavity 42 against the force of the spring 40, as indicated by arrow 44 in FIG. 7. This extends the retaining disc 34 beyond the louver 38, as shown in phantom in FIG. 7. Then the locking pin 32 is rotated to align the retaining disc 34 for abutment with the louver 38. This alignment of the retaining disc 34 is represented by arrow 46 in FIG. 7. Once the retaining disc 34 has been properly oriented within the air vent 26, the handle 36 is released by the user, thereby allowing the return action of the spring 40 to urge the locking pin 32 outwardly from the cavity 42, thus bringing the retaining disc 34 into abutment with a portion of the louver 38.

In another preferred arrangement for allowing the locking pins 32 to be positioned inwardly or outwardly relative to the attachment head 24, the locking pins 32 can be provided with a threaded portion 48 which is retained within a threaded port 50 in the attachment head 24, as illustrated in FIGS. 8 and 9 Manipulation of a knob 52 of the locking pin 32 will enable one to screw the locking pin into the air vent until the retaining disc 34 engages the louver 38.

In both the spring biased arrangement of FIG. 7 and the threaded arrangement of FIGS. 8 and 9, a sealing strip 54 is provided around the perimeter of the attachment head 24 so that the union of the attachment head with an air vent 26 is air tight.

In yet another preferred embodiment of the invention, the ventilated support pad 10 can be provided with its own internal source of forced air, preferably an electric fan 56 (FIG. 3) including an electric motor and a fan blade coupled thereto. The fan 56 is mounted within the support pad 10 in such a way so as to blow air out the apertures 12. In order to permit an intake of fresh air (as indicated by arrow 57) into the electric fan 56, one or more air intake openings 58 is provided within the support pad 10. Preferably air intake opening 58 is covered by a screen or mesh which allows free passage of air therethrough.

The fan 56 may be powered by one or more batteries 60 housed within a battery compartment 62 (shown in dashed outline) provided within the support pad 10. Access means to the battery compartment 62 are provided so that periodic replacement of the batteries 60 is permitted. When the present invention is embodied with an internally mounted, battery powered fan, the ventilated support pad can be used, for example, with wheelchairs, office chairs, strollers, and home furniture, as well as in vehicles.

Alternatively, the fan 56 may be energized by electrically coupling the fan to the battery of an automobile using a conventional adaptor 64 which plugs into the cigarette lighter port of an automobile. A power switch 66 is mounted on the exterior of the support pad 10, adjacent the internally mounted fan 56, so that a user can conveniently activate the forced air flow provided by the ventilated support pad. The electrical interconnection between the switch 66 and the fan 56 and the batteries 60 can be accomplished in a manner well known in the art. The switch 66 is electrically coupled to the adaptor 64 by a cord 68.

An advantageous feature of the embodiments illustrated in FIGS. 1—3 is that each aperture 12 has a rim 70 (FIG. 10) thereabout which is unconventionally configured so as to prevent a user's body from completely blocking each aperture. Each rim 70 has an irregular elevation (evident in the cross-section view of FIG. 10) rather than a smooth surface, about the aperture 12, such that miniature protrusions 72 are provided. These protrusions 72 should be small enough to avoid being a discomfort to the user, but should be large enough to space a user slightly outwardly from completely blocking the apertures 12, thereby enabling a forced air flow to escape from the apertures and comfort the user.

The protrusions 72 can be shaped other than as illustrated in FIG. 10, with rounded rather than sharp shapes being recommended for comfort. Alternatively, the user can be prevented from completely blocking the apertures 12 by providing rims 70 which are angled with respect to the appropriate face of the support pad. An excess number of apertures 12 is not desirable if air is being directed other than on the user's body by said excess apertures, because the excess apertures will reduce the air pressure through other, more effective apertures which do force air into contact with the user.

FIG. 4 illustrates yet another preferred embodiment of the invention, in which the plurality of apertures 12 shown in FIGS. 1—3 are replaced by a single enlarged aperture covered by a screen 74. (Screen 74 obscures this aperture in FIG. 4) Screen 74 can also be rattan mat, mesh, or the like, so long as forced air is permitted to freely flow from the support pad 10 into contact with a user. The single enlarged aperture of this embodiment receives a supply of forced air via internal air passageways which place said aperture in fluid communication with either an automotive air vent (via flexible hose 20) or an internally mounted fan (as in FIG. 3).

As an option, air drawn into the ventilated support pad 10 can be passed through filter means so that air exhausted from the pad is substantially free of dust and other contaminants.

In use, a person resting against the ventilated support pad 10 will have a comforting cool or warm air flow, as illustrated by arrows in FIGS. 1—4, forced into contact with his or her body.

While it is contemplated that the present invention will be primarily useful as a separate back and/or seat support that is sized to be applied over a chair or seat, it will be appreciated that the back support section 14 and/or the seat support section 16 could also be fixedly attached to the chair so as to constitute the actual back and/or seat of the chair. Alternatively, the ventilated support sections 14 and 16 could be built-in as an integral part of a chair or automobile seat 76.

From the foregoing, it will be appreciated that the improved ventilated support pad of the present invention advantageously provides an auxiliary circulation system which provides a comforting air flow to areas of a user's body, particularly the back, which are not normally exposed to forced air from conventional automobile air conditioning systems. Further, utilization of the automotive air vent as a source of forced air for the invention advantageously enables the user to select cool or warm air to be delivered by the support pad as desired. Further, the present invention can be attached to a selected automotive air vent in an easy manner which does not require tools, or can be embodied with its own internal forced air supply for use in wheelchairs, etc.

While several particular forms of the invention have been illustrated and described, it will also be apparent that various modifications can be made wihtout departing from the spirit and scope of the invention. Accordingly, it is not intended that the invention be limited, except as by the appended claims.

I claim:

1. A ventilated body supporting device for use particularly in a vehicle having one or more internal air vents, comprising:

a main body of molded plastic material having a configuration that is appropriate for supporting the back of an individual, said main body including at least one face having at least one aperture therethrough and at least one internal air passageway therein, wherein one end of the at least one air passageway is in fluid communication with a source of air, and the opposite end of the at least one air passageway is in fluid communication with said at least one aperture such that when the device is supporting an individual contacting the apertured face, a forced air flow can be directed along said at least one air passageway, through said at least one aperture, and into direct contact with the individual;

conduit means for placing said at least one air passageway in fluid communication with said air source; and means for releasibly attaching said conduit means to a selected air vent in the vehicle, thereby enabling said air vent to be employed as the air source, said means for releasibly attaching said conduit means including at least one locking pin protruding from a free end of said conduit means, wherein said at least one locking pin is adapted for releasible engagement with a selected air vent in the vehicle.

2. A ventilated body supporting device as set forth in claim 1, wherein said conduit means includes a generally funnel shaped attachment head at said free end, wherein said at least one locking pin includes at an end thereof, a retaining disc disposed generally perpendicular thereto, wherein said at least one locking pin is rotatably received within said attachment head such that said locking pin can be rotated to an orientation whereby its retaining disc engages a louver of an automobile vent.

3. A ventilated body supporting device as set forth in claim 2, wherein said at least one locking pin is biased by spring means which urge the at least one locking pin outwardly from whichever air vent is selected for engagement with said attachment head, wherein biasing action of the spring means against the locking pin urges said retaining disc into engagement with said vent louver.

4. A ventilated body supporting device as set forth in claim 2, wherein at least a portion of said at least one locking pin is threaded and is retained within a threaded port within said attachment head, wherein the threaded locking pin can be manually screwed inwardly or outwardly relative to said attachment head, thereby enabling the locking pin to be oriented within the port at a position whereat said retaining disc of said locking pin securely engages the vent louver.

5. A ventilated body supporting device as set forth in claim 2, wherein said attachment head includes means for effecting an air-tight seal around the selected air vent.

6. An improved ventilated body supporting device, particularly for use in vehicles having one or more air vents, comprising
 a back support pad including at least one face having at least one aperture therethrough, and air passageway means placing said at least one aperture in fluid communication with a source of forced air;
 conduit means for providing an air flow pathway from a selected automobile air vent to said air passageway means, wherein said conduit means has a first end fixed to said support pad and in fluid communication with said air passageway means and a second, free end which includes a generally funnel shaped attachment head adapted for releasibly connecting to the selected automobile air vent, wherein said attachment head includes at least one locking pin which is adapted for removable engagement with a louver of the selected automobile air vent.

7. An improved ventilated body supporting device as set forth in claim 6, including a single enlarged aperture in fluid communication with said air passageway means, said enlarged aperture being covered by a screen, mesh, or the like, which freely permits a passage of forced air therethrough.

8. An improved ventilated body supporting device as set forth in claim 6, wherein said conduit means comprises a flexible hose.

9. An improved ventilated body supporting device as set forth in claim 8, wherein said attachment head includes means for effecting an air-tight seal around the selected air vent.

10. An improved ventilated body supporting device as set forth in claim 9, wherein at least two faces of said back support pad are apertured, with said air passageway means directing a forced air flow through each of said two apertured faces.

11. An improved ventilated body supporting device as set forth in claim 10, wherein said at least one locking pin includes at an end thereof, a retaining disc disposed relatively perpendicularly thereto, wherein said at least one locking pin is rotatably retained within said attachment head such that said at least one locking pin can be rotated to an orientation wherein its retaining disc is aligned for engaging the louver of the selected automobile air vent, wherein said at least one locking pin is biased by spring means which urge the at least one locking pin outwardly from whichever air vent is selected for engagement with said attachment head, and wherein biasing action of the spring means against the locking pin urges said retaining disc into contact with said louver.

12. An improved ventilated body supporting device as set forth in claim 11, wherein said back support pad has a seat support rest integrally formed therewith at a relatively perpendicular orientation thereto, and wherein said seat support rest also includes at least one face having at least one aperture therethrough, said seat support rest also being in fluid communication with said air passageway means such that forced air is directed through at least one apertured face of the seat support rest.

* * * * *